Dec. 4, 1962    J. S. TAYLOR, JR    3,066,693
FLOAT VALVE FOR DRILL PIPE AND THE LIKE
Filed Feb. 18, 1960    2 Sheets-Sheet 1
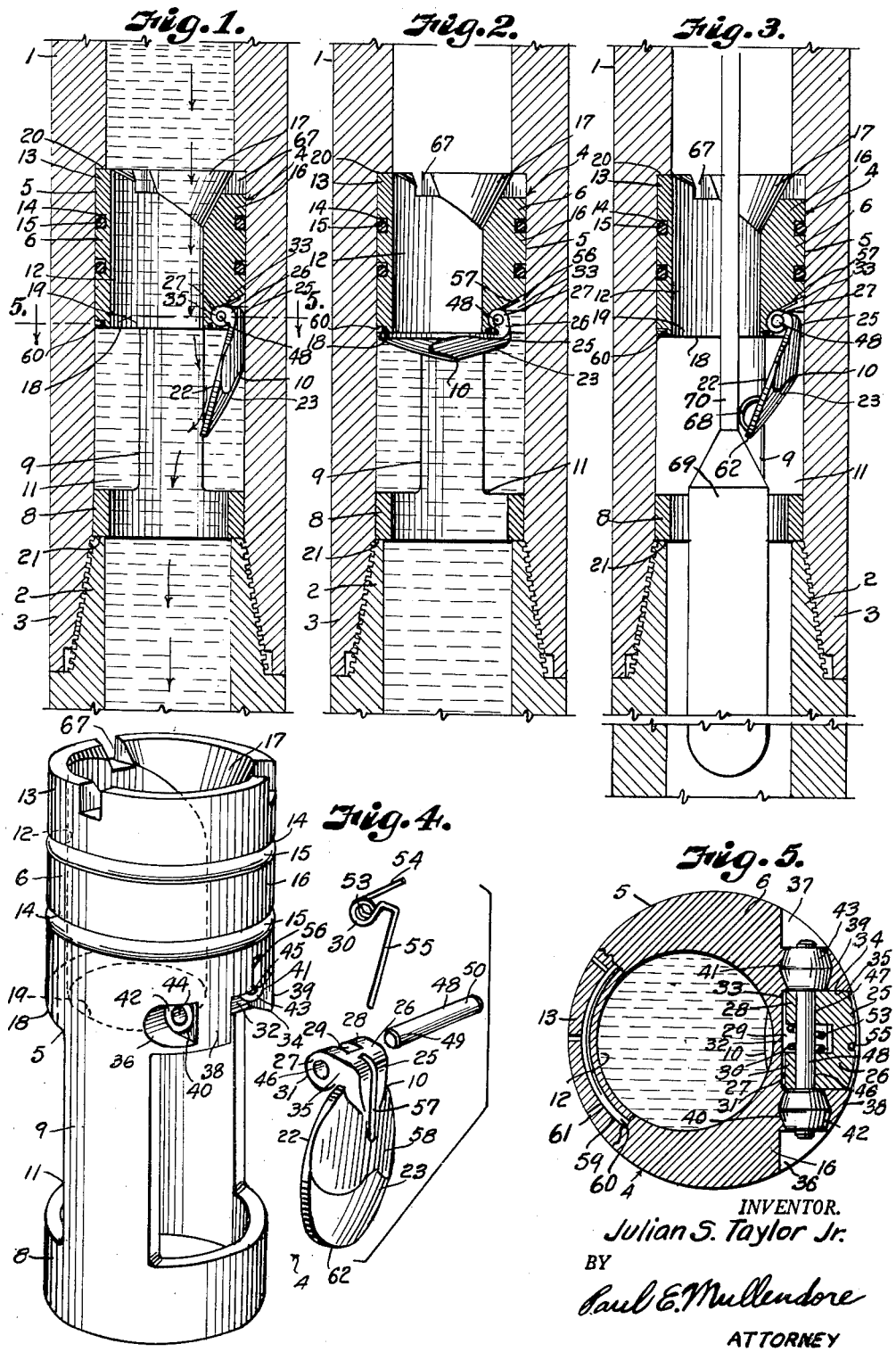
INVENTOR.
Julian S. Taylor Jr.
BY
Paul E. Mullendore
ATTORNEY Dec. 4, 1962 J. S. TAYLOR, JR 3,066,693
FLOAT VALVE FOR DRILL PIPE AND THE LIKE
Filed Feb. 18, 1960 2 Sheets-Sheet 2
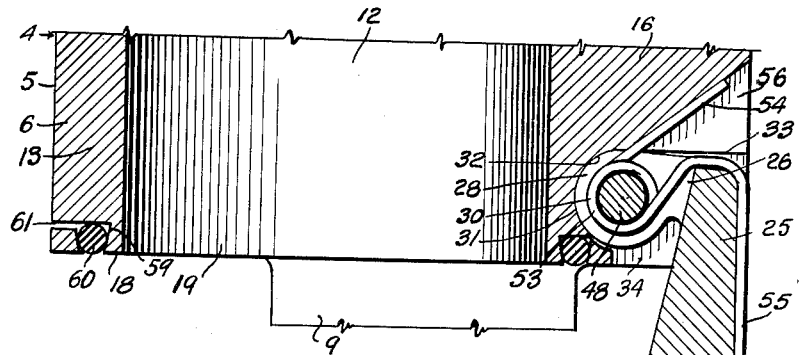
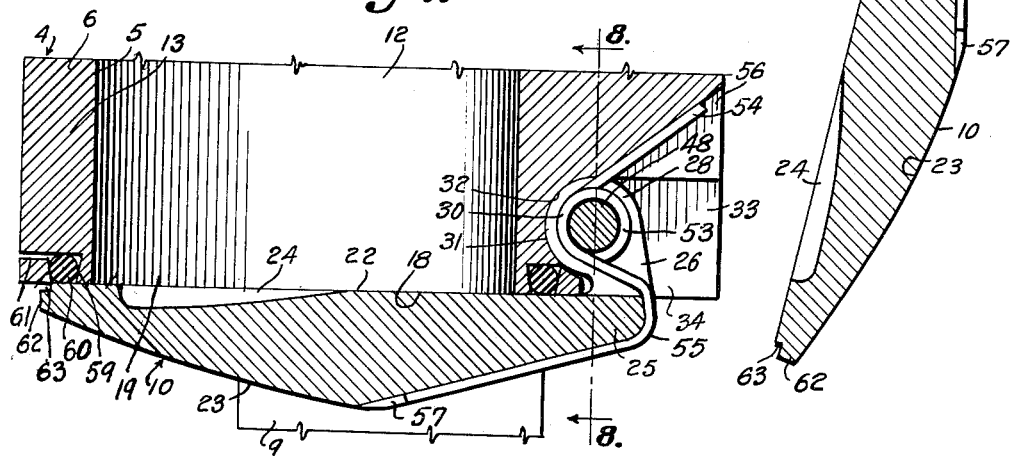
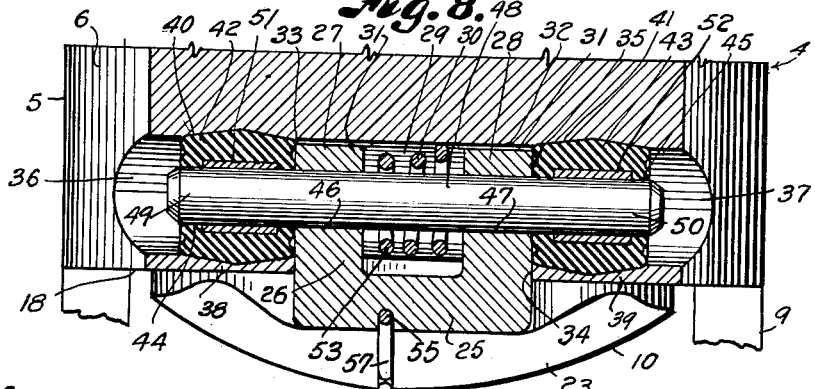
INVENTOR.
Julian S. Taylor Jr.
BY
Paul E. Mullendore
ATTORNEY.

United States Patent Office 3,066,693
Patented Dec. 4, 1962

3,066,693
FLOAT VALVE FOR DRILL PIPE AND THE LIKE
Julian S. Taylor, Jr., Milwaukee, Wis.
(414 E. Northrop Drive, Midwest City, Okla.)
Filed Feb. 18, 1960, Ser. No. 9,482
6 Claims. (Cl. 137—454.2)

This invention relates to back pressure valves, and particularly to those of a type commonly known as drill pipe floats, in that they are used in the drill pipe of a rotary drilling rig, the function of such valves being in effect to float the drill pipe in the fluid in the bore hole during running into and out of the drill pipe, thereby relieving part of the strain on the derrick and rig equipment. Such valves are also useful for preventing blowouts of formation pressures through the drill pipe, and for preventing a plugged bit when running the drill pipe into the bore hole. They also prevent gushing of the well fluid from the upper end of the drill pipe and wetting the drilling crew and surface equipment.

While such valves are to perform these and other important functions, they introduce many problems, such as impeding flow of the drilling fluid. The valves are also objectionable because of erosion of the parts by the drilling fluid; leakage under back pressure; failure to close properly; difficulty of passing and retrieving tools, particularly when drilling with air and gas fluids; difficulty in providing parts of ample size and strength within the restricted limits of the drill pipe sufficient to withstand the rigorous service to which such valves are subjected; exposure of vital parts of the valve to the drilling fluid; oscillation of the valving element; and other reasons that result in failure of such valves.

The present invention is, therefore, to provide a back pressure valve structure that eliminates these and other difficulties.

Other objects are to provide a back pressure valve of the flapper type to give less restriction to the drilling fluid, to allow passage and retraction of various tools and instruments that may be used in the drill pipe; to provide a structure wherein the flapper hinge is located out of the flow of drilling fluid, protected from erosion and sheltered by the flapper; to provide a structure which results in stronger, more secure mounting with larger pivotal elements; to provide a structure in which the flow of drilling fluid retains the flapper in a generally fixed open position and prevents oscillation thereof; to provide a flapper which deflects the drilling fluid in a manner to reduce wear and erosion of the flapper; and to provide a resilient support of the flapper to permit self adjustment of the flapper on its seat and yet provide for freedom of movement of the hinge element.

It is also an object of the invention to provide the flapper with means to indicate visually the extent of wear on the flapper that is caused by the drilling fluid and when the wear reaches a point when the flapper should be replaced.

In accomplishing these and other objects of the invention hereinafter pointed out, I have provided improved structure, the preferred forms of which are illustrated in the accompanying drawings, wherein:

FIG. 1 is a vertical section through a portion of a string of drill pipe illustrating a back pressure or float valve embodying the features of the present invention and showing the valving element in open position responsive to flow of the drilling fluid.

FIG. 2 is a similar view showing the valving element in closed position to prevent back flow through the drill pipe, as when shutting off back pressure and when lowering the drill pipe into the bore hole.

FIG. 3 is a similar view showing a modified form of valving element adapted to be retained in open position during lowering of a tool or the like through the valve.

FIG. 4 is an enlarged perspective view of parts of the back pressure valve, shown in disassembled, spaced relation to better illustrate the construction thereof.

FIG. 5 is a horizontal section through the back pressure valve taken on the line 5—5 of FIG. 1, particularly showing offset of the passage through the valve.

FIG. 6 is an enlarged section through the seat portion of the back pressure valve, showing the valving element or flapper in open position.

FIG. 7 is a similar view showing the valving element or flapper in closed position.

FIG. 8 is a section on the line 8—8 of FIG. 7 to illustrate mounting of the hinge pin.

FIGS. 9, 10 and 11 show fragmentary sections of a flapper valve, illustrating modified means for visually indicating wear caused by erosion of the drilling fluid.

Referring more in detail to the drawings:

1 designates a portion of a string of drill pipe, such as used in rotary drilling of a bore hole. The string of drill pipe is made up of stands of pipe connected together by pin and box joints 2 and 3. The lower end of the drill pipe carries the drill bit (not shown), and the upper end is connected with a kelly (also not shown) that provides a connection between the drill pipe and the rotary turntable of the drilling rig by which the drill pipe is rotated to rotate the bit. The Kelly rod is connected with a swivel head through which a drilling fluid is supplied under pressure for circulation downwardly through the pipe for discharge through the bit to carry the cuttings to the top of the bore hole, as in the usual rotary drilling practice.

As the bore hole deepens, additional stands of pipe are added between the Kelly rod and the uppermost section of pipe. The weight of the drill pipe increases with the addition of each stand of drill pipe, and in deep drilling the weight of the drill pipe places the drilling rig and drilling equipment under severe strain, particularly when running the sections of pipe into the bore hole, when it becomes necessary to change bits or to perform other operations incidental to rotary drilling. To avoid this difficulty and reduce the load on the derrick and other surface equipment, most drill pipes are equipped with a back pressure or float valve that may be located at different elevations in the drill pipe, usually in parts thereof close to the drill bit, although in some instances if the main use is to eliminate back pressure, such valves may be located near the upper end of the drilling string. In any instance the valve is to act as a check valve to prevent blowouts through the drill pipe and to serve as a float and to prevent gushing of the well fluids through the upper end of the drill pipe when the drill pipe is being lowered into the bore hole and to allow passage of the drilling fluid to the drill bit when drilling.

The back pressure valve of the present invention is generally indicated by the numeral 4 and includes a body member 5. The body member comprises an upper cylindrical portion 6 and a lower cylindrical portion 8 that is connected therewith by bar portions 9. The upper portion 6 is to carry seals with the bore of the drill pipe and to provide a seat for a valving element or flapper valve 10. The lower portion 8 cooperates with the bar portions 9 to provide a cage 11 (FIGS. 1 to 4, inclusive) in which the valving element or flapper valve 10 is adapted to operate.

It is obvious that the inner diameter of a drill pipe is limited in size, and a back pressure valve inserted therein is a restriction to the flow of the drilling fluid, and particularly when the parts of the valve are of a size to be sufficiently strong to withstand the rugged conditions under which such valves must operate. When the parts are of small size they are too fragile to stand up under service. This is particularly true of the hinge pin 48 and mounting therefor where a flapper type of valving element 10 is used, as in the case of the present invention, because a flapper offers less restriction to the flow and functions better under abrasive conditions.

In carrying out the present invention and to avoid this difficulty, the flow passage 12 through the portion 6 of the valve body is offset laterally from the rotary axis of the drill pipe, to leave on one side thereof a wall portion 13 only of sufficient thickness to adequately accommodate the annular grooves 14 for containing packing rings 15, so that the opposite diametrical side has a substantially thick wall portion 16 to provide the material necessary to mount the hinge pins 48 of ample size to support the valving element 10 and to protect the valving element 10 when in open position. In this way, a wall portion 16 of ample thickness is provided with an adequate flow passageway 12 (FIG. 5). To facilitate the flow from the drill pipe into the inlet of the passageway 12, the upper end of the portion 6 is flared or funneled as indicated at 17. The lower end of the body portion 6 has a flat face 18 surrounding the outlet of the passageway 12 to provide an annular seat portion immediately encircling the outlet or port 19.

The body member 5 may be of a diameter to slide freely within the axial bore of the drill pipe part or section in which it is inserted because of the seal effected by the packing rings 15 and of the clamping action on the ends of the body member 5 between an internal annular shoulder 20 and the end 21 of the pin 2 (FIGS. 1, 2 and 3).

As above stated, the valving element 10 is of the flapper type and comprises a disk shaped body having a generally flat face 22 and a somewhat coned opposite face 23 to provide the thickness of material necessary to accommodate a flow directional recess 24 within the flat face 22 of the valving element. The hinge point of the valving element is located above the seating face 18 and within the lower part of the relatively thick wall portion 16 (FIGS. 6, 7 and 8). Therefore, the disk shaped body of the valving element or flapper valve 10 has a radially extending arm portion 25 carrying a lug portion 26 that extends laterally from the arm portion 25 above the seating face 18. The lug portion 26 is shaped to provide ears 27 and 28 having a recess 29 therebetween to accommodate a spring 30, later to be described (FIGS. 4, 5, 6, 7 and 8). The ears 27 and 28 have generally circular face portions 31 to fit within the circular portion 32 of a recess 33. The recess 33 extends upwardly from the seating face 18 and inwardly of the outer face of the wall portion 16, as best illustrated in FIGS. 4, 5, 6 and 7. The recess 33 is of a width to accommodate the ears 27 and 28 therein and the facing sides 34 thereof are substantially flat to contact the outer side faces 35 of the respective ears, as shown in FIGS. 4 and 8.

Aligning axially within the recess 33 are recesses 36 and 37 spaced therefrom to leave ears 38 and 39 having axial bores 40 and 41 to accommodate therein resilient bushings 42 and 43 (FIGS. 4, 5 and 8). The bores 40 and 41 have the midportions of larger diameter to key tapered peripheries of the bushings therein, as best illustrated in FIG. 8. The resilient bushings 42 and 43, therefore, fit snugly and tightly within the bores 40 and 41 of the ears 38 and 39 and have axial openings 44 and 45 (FIG. 8) registering with axial openings 46 and 47 in the ears 27 and 28 of the valve element for passing therethrough the hinge pin 48. The hinge pin 48 fits tightly within the bores 46 and 47 of the ears 27 and 28 so that it turns with the valve, but the end portions 49 and 50 (FIG. 8) of the hinge pin turn freely within bearing sleeves 51 and 52 that are bedded within the resilient bushings 42 and 43, the sleeves 51 and 52 being preferably of nylon or Teflon material.

It is thus apparent that the ends 49 and 50 of the hinge pin 48 are resiliently supported in the ears 38 and 39 by reason of the resilient bushings 42 and 43. The resilient bushings 42 and 43 are important for cushioning the pound and shock forces, caused by impact of high velocity fluid turbulently moving past the flapper when in open position. Without protection by the bushings of the vital pivotal points from shock forces, the useful life would be short, because the hinge pin 48 and lugs 27 and 28 on the valving element or flapper valve 10 would soon pound out, but with the resilient bushings the useful life of the parts is increased indefinitely. The sleeves 51 and 52 inside the resilient bushings 42 and 43 reduce the rotational friction between the pin 48 and bushings, so that the pin turns freely to allow for free action of the valving element or flapper valve 10.

The spring 30 is adapted to normally hold the valving element or flapper valve 10 in closed position, and includes a coil portion 53 that is mounted on the hinge pin 48 within the recess 29 and the ends of the coil portion terminate in arms 54 and 55 that respectively engage in a groove 56 in the body member 5 and in a groove 57 in the outer side 23 of the flapper valve, as illustrated in FIGS. 6 and 7. The groove 56 extends upwardly from the recess 33 at a point between the ears 38 and 39, as best shown in FIG. 4.

The face portion 23 above the horizontal diameter of the flapper is rounded transversely as indicated at 58 to substantially conform to the curvature of the drill pipe, so that the drill pipe forms an abutment for the valving element or flapper valve 10 to hold the valving element or flapper valve 10 with the face 22 thereof in slightly inclined position relatively to the longitudinal axis of the valve, as shown in FIGS. 1 and 6. This is desirable to prevent the flapper 10 from oscillating. By having the drilling fluid impinging on the slightly inclined face 22 of the valve, the fluid under flow will continuously hold the flapper 10 in an open position, opposing the action of the spring 30. The inclined flapper surface 23 in the open position acts to urge the flapper to the closed position by counterflow in the event of spring failure. The indentation or recess 24 serves as a hydraulic deflection surface to protect the valve from abrasion (FIGS. 6 and 7).

In order to supplement seal between the seat 18 and face of the valving element or flapper valve 10 and, in fact, provide the principal seal, the peripheral portion of the face 18 has an inwardly extending annular groove 59 of dovetail cross section for retaining an annular sealing ring 60 which is of resilient material to make resilient contact with the flat face 22 of the valving element or flapper 10. The groove is also vented through ports 61 to allow passage of any fluid trapped under the sealing ring 60. These ports are important to prevent the trapped liquid from popping the ring 60 out of the groove 59 and being cut off by the flapper.

Wear on the seating face 22 of the valve is critical and should not exceed an amount of $\frac{3}{64}$ inch, therefore, when the wear approaches this amount the valve should be replaced. The wear on the valving element or flapper valve 10 is not always discernible to the usual driller, and, therefore, to avoid the necessity of actual measurement, the lip portion 62 of the valve is provided with a transverse groove or notch 63 (FIGS. 6 and 7), for example, $\frac{3}{64}$ inch deep on the seating face side thereof, so that when the wear tends to obliterate the notch 63 the valve should be replaced. FIGS. 9, 10 and 11 show different ways of providing other types of a visual wear indicating means for determining the amount of wear. In FIG. 9 the lip of the valve is provided on the under side with a transverse groove 64 to leave a lip portion $\frac{3}{64}$ inch thick, so that when it is substantially worn off the valve should be replaced. In FIG. 10 the peripheral edge of the valving element or flapper valve 10 has an intermediate groove 65 to leave a lip portion on the seating face of the valve $\frac{3}{64}$ inch thick. In FIG. 11, the indicating means comprises a hole 66 that is drilled from the face side 23 into the material of the valving element or flapper valve, to terminate 3/64 inch from the face 22, so that when the wear is sufficient to expose the hole 66, the valve should be replaced.

Notches 67 in the portion 6 of the valve body accommodate a centering device for a deviation indicator (not shown).

The valving element or flapper valve illustrated in FIG. 3 has a loop 68 fixed to the face thereof to be engaged by a tool 69 that is to be lowered through the drill pipe. The loop 68 is also adapted to engage the cable 70 to hold the valving element or flapper valve 10 open during lowering and lifting of the tool 69. The loop 68 is preferably of spring material and is suitably fastened at the ends to the face of the valve.

The back pressure valve may be installed at a desired position in a string of drill pipe 1, however, it is usually inserted at a low point, for example, in the stand of pipe to which the drill bit is connected or in a short section of pipe having the shoulder 20 which is inserted between the lower stand in the drilling string and the pin 2 of the drill bit, in which case the body member 5 is rigidly retained from axial movement between the shoulder 20 and the end face 21 of the pin 22 and is itself coaxial with the bore of the drill pipe, but the axis of the flow passage 12 therein is offset, as shown in FIG. 1. During lowering of the drill pipe through the bore hole, the valving element or flapper valve 10 is held in closed position by the action of the spring 30, so that the drilling fluid in the well does not gush upwardly and escape through the upper end of the drill pipe.

When the drill bit reaches the bottom of the hole and the drilling fluid is circulated through the drill pipe, the valving element or flapper valve opens against the action of the spring 30, that is, the valving element or flapper valve 10 is moved downwardly and outwardly from its sealing contact with the O-ring 60 under pressure of the drilling fluid until the portion 58 of the flapper valve engages the wall of the portion of the drill pipe in which the valve has been located. In this position, the flat face portion 22 of the flapper valve slopes downwardly and inwardly for sufficient impingement of the drilling fluid thereon to hold the flapper valve in open position during the time that the drilling fluid is in circulation. It will be noted that the portion of the drilling fluid impinging in the recess 24 is deflected thereby and out of contact with the flat portion of the valve that makes contact with the O-ring 60, so that abrasive material in the drilling fluid does not tend to wear the valving element or flapper valve 10 at the points where a seal is effected when the valving element or flapper valve is closed. When the valving element or flapper valve 10 is being held in open position, it is located under and protected by the relatively thick portion 16 of the body member. It is also to be noted that the hinge pin 48, spring 30, and bushings 42 and 43 of the hinging elements are located out of the path of the drilling fluid, therefore, they are not subject to clogging and/or cutting by the solids carried with the drilling or pressure fluid.

While the pressure fluid moves with substantial turbulence across the face of the valve, the shocks imparted thereby are absorbed by the resilient bushings 42 and 43 and, therefore, the hinge pin 48 and hinge ears 27—28 and 38—39 are not subject to pounding out, consequently they have a substantially long life.

It is also obvious that the resilient bushings provide a yieldable pivotal axis for the flapper valve, to assure positive seating thereof when the flapper is closed, as when floating in the drill pipe, and for excluding the drilling fluid that is in the bore hole from passing upwardly into the bore of the drill pipe. The yieldable axis also assures positive seating of the flapper valve in case of a blow-back pressure acting upon the flapper valve.

In case of a blowback resulting from high pressure in the formation through which the bore hole is drilled, the valving element or flapper valve 10 will act as a check. That is, the pressure will act, together with the spring, to close the valve and block off the high pressure from blowing out through the drill pipe. When the valve is in closed position, the seating face of the flapper valve makes sealing contact with the O-ring 60 to assure that the high pressure does not pass the valve.

Another feature is that pressure cannot accumulate behind the O-ring, since any leaking pressure around the ring is vented through the ports 61.

When the string of drill pipe is removed, the flapper valve may be inspected for wear by observing the depth of the notches 63. When it is noted that the notches 63 have been obliterated, then the flapper valve should be removed and replaced with a new flapper valve.

The sleeves 51 and 52 are also an important feature of the invention in that while the bushings prevent pounding out of the hinge pin and related parts, the hinge pin 48 rotates freely within the bearing sleeves when swinging to and from closed position.

When drilling with air or gas under pressure and tools are to be lowered through the drilling string by means of a cable, the back pressure valve is usually located near the upper end of the drilling string, in which case a valving element or flapper valve 10 may be used having the cam part 68 as shown in FIG. 3 to hold the valve element open by engagement thereof with the cable 70. Otherwise the construction and mounting of the valving element 10 is the same as that illustrated in the first form of the invention.

From the foregoing it is obvious that I have provided a flapper type control valve wherein the parts are of rugged construction and are capable of withstanding the forces to which they are subjected, all without materially obstructing flow through the drill pipe.

What is claimed and desired to be secured by Letters Patent is:

1. A valve for controlling flow of fluid through a string of drill pipe contained vertically in a bore hole, said valve including a body member adapted to fit within the drill pipe and having a flow passageway extending vertically therethrough and having an annular seat encircling the lower end of said passageway, a flapper valve having a seating face and having hinge means, a hinge pin fixed to the hinge means and having bearing portions on opposite sides of the hinge means, resilient bushing means carried in spaced apart relation in the body member transversely to the flow passageway at a point above said seat on the exterior side thereof for resiliently containing the bearing portions of the hinge pin to hinge the flapper valve on a yieldable transverse axis above said annular seat and laterally of the flow passageway to prevent pound out of the hinge pin under impingement of the fluid upon the seating face side of the flapper valve when in an open position, and resiliently yieldable means for retaining said flapper valve in a closed position with the seating face thereof in contact with the annular seat, said retaining means being yieldable responsive to pressure of the fluid upon said flapper valve to move the flapper valve downwardly and laterally from the annular seat to said open position with the seating face of the flapper valve sloping downwardly and inwardly for sufficient impingement of the fluid thereon to hold the flapper valve generally fixed in said open position during flow of said fluid, said seating face of the flapper valve having a recess portion within said seating face, said recess being of a shape to provide an hydraulic surface for deflecting said fluid from said surrounding seating face of the flapper valve to reduce wear of said surrounding seating face by said impingement and abrasive action of the fluid.

2. A valve for controlling flow of fluid through a string of vertical pipe contained in a bore hole, said valve including a body member adapted to fit within the pipe and having a vertical flow passageway extending axially therethrough and having an annular seat encircling the lower end of said passageway, a flapper valve having a seating face and having hinge means, a hinge pin fixed to the hinge means and having bearing portions on opposite sides of the hinge means, resilient bushing means carried in spaced apart recesses in a bore of the body member extending transversely to the flow passageway at a point above said seat and on the exterior side thereof for containing the bearing portions of the hinge pin to hinge the flapper valve on a yieldable transverse axis above said annular seat and laterally of the flow passageway to prevent pound out of the hinge pin under impingement of the fluid upon the face side of the flapper valve when in an open position, and means for retaining said flapper valve in a closed position with the seating face thereof in contact with the annular seat, said retaining means being yieldable responsive to pressure of the fluid flowing downwardly through the passageway and against said flapper valve to move the flapper valve downwardly and laterally from the annular seat to said open position with the seating face of the flapper valve sloping downwardly and inwardly for insufficient impingement of the fluid thereon to hold the flapper valve generally fixed in said open position during flow of said fluid, said flapper valve having a recess portion surrounded by said seating face thereof and said recess portion being of a shape to provide a hydraulic surface for deflecting said fluid from said surrounding seating face to reduce wear of the seating face of the flapper valve, and said seating face having means to indicate visually the wear that may occur on said seating face.

3. a valve for controlling flow of fluid through a string of vertical pipe contained in a bore hole, said valve including a body member adapted to fit within the pipe and having a vertical flow passageway extending axially therethrough and having an annular seat encircling the lower end of said passageway, said seat having an annular groove, a resilient ring in said groove, a flapper valve having an annular seating face and having hinge means, a hinge pin fixed to the hinge means and having bearing portions at the ends thereof, spaced apart, resilient bushing means carried in the body member transversely to and offset from the flow passageway at a point above said seat on the exterior side thereof for containing the bearing portions of the hinge pin to hinge the flapper valve on a yieldable transverse axis above said annular seat and laterally of the flow passageway to prevent pound out of the hinge pin under turbulent action of the fluid upon the flapper valve when in an open position, and means for retaining said flapper valve in a closed position with the seating face thereof in sealing contact with the resilient ring, said retaining means being yieldable responsive to pressure of the fluid upon said flapper valve to move the flapper valve downwardly and laterally from the annular seat to said open position with the face of the flapper valve having the annular seating face sloping downwardly and inwardly for sufficient impingement of the fluid thereon to hold the flapper valve generally fixed in said open position during flow of said fluid, said face of the flapper valve having a recess portion of a shape to provide an hydraulic surface for deflecting said fluid from said annular seating face of the flapper valve to reduce wear of said annular seating face by abrasive action of the fluid.

4. A float valve for controlling flow of high pressure fluid through a vertical string of drill pipe, said float valve including a cage having an upper cylindrical portion providing a sealed fit when the float valve is mounted within the drill pipe and having a transverse lower face, said upper cylindrical portion having a vertical passageway extending through said transverse face on an axis offset laterally from the axis of the upper portion of the cage to provide a thick-walled portion at one diametrical side, said transverse face having an annular seat concentrically encircling the passageway, a flapper valve having a seat for engaging said annular seat of said upper part of the cage for closing the passageway, said thick-wall portion having a recess extending upwardly from said transverse face on the outer side of said annular seat and opening outwardly through said thick-walled portion, said thick-walled portion also having axially aligned transverse bores at opposite sides of said recess and located above said annular seat, resilient bushings fitting tightly within the bores, bearing sleeves bedded within said resilient bushings, spaced apart ears projecting at substantially right angles from the seating face of the flapper valve and into said recess, a hinge pin fixed within said ears and having ends journaled to turn within the bearing sleeves to provide a hinged support for the flapper valve having a width approaching the diameter of the flapper valve and to form a hinging axis above said annular seat, means for normally retaining the flapper valve in closing relation with said passageway and yieldably responsive to the pressure fluid when flowing through the passageway, said flapper valve being movable downwardly and laterally from said annular seat as the ears swing about said hinging axis and into said recess to carry the flapper valve to an open position substantially out of the flow issuing through said passageway, with the back of the flapper valve in contact with the drill pipe to support the seating side of the flapper valve in a downwardly sloping position for sufficient impingement of the pressure fluid thereon to hold the flapper valve substantially immovable in said open position.

5. A float for controlling flow of high pressure fluid through a vertical string of drill pipe, said float valve including a cage having an upper cylindrical portion providing a sealed fit when the float valve is mounted within the drill pipe and having a vertical passageway extending through a transverse lower face, said transverse face having an annular seat concentrically encircling the passageway, a flapper valve for closing the passageway and having a surrounding seating face for engaging said annular seat of said upper part of the cage, means for hinging the flapper valve to the upper cylindrical portion of the cage at one side thereof to swing on an axis located above said transverse face from a position closing the passageway to an open position with the seating face of the flapper valve sloping downwardly and inwardly for sufficient impingement of the fluid thereon to hold the flapper valve generally fixed in said open position during flow of the fluid, and the said flapper valve having a shape inside the seat thereof to provide a hydraulic surface for deflecting said fluid away from said surrounding face to minimize wear on said surrounding seating face of the flapper valve by said impingement and abrasive action of the fluid.

6. A float valve for controlling flow of high pressure fluid through a vertical string of drill pipe as described in claim 5, and wherein the seating face has means to indicate visually the wear that may occur on said seating face.

References Cited in the file of this patent

UNITED STATES PATENTS

| | | |
|---|---|---|
| 944,219 | Stines | Dec. 21, 1909 |
| 1,286,672 | Lindgren | Dec. 3, 1918 |
| 1,827,233 | Hughes | Oct. 31, 1931 |
| 2,578,076 | Kirby | Dec. 11, 1951 |
| 2,655,936 | Wexler | Oct. 20, 1953 |
| 2,738,240 | Parsons | Mar. 13, 1956 |
| 2,851,314 | Thomson | Sept. 9, 1958 |
| 2,853,325 | Ward | Sept. 23, 1958 |
| 2,878,826 | Dolenga | Mar. 24, 1959 |
| 2,921,601 | Fisher | Jan. 19, 1960 |
| 3,016,914 | Keithahn | Jan. 16, 1962 |

FOREIGN PATENTS

| | | |
|---|---|---|
| 503,294 | Germany | 1930 |